United States Patent [19]

Pavlath

[11] Patent Number: 4,679,894
[45] Date of Patent: Jul. 14, 1987

[54] ELECTRICALLY SWITCHED FIBER OPTIC DIRECTIONAL COUPLER

[75] Inventor: George A. Pavlath, Thousand Oaks, Calif.

[73] Assignee: Litton Systems, Inc., Beverly Hills, Calif.

[21] Appl. No.: 642,215

[22] Filed: Aug. 20, 1984

[51] Int. Cl.$^4$ .............................................. G02B 6/26
[52] U.S. Cl. ............................. 350/96.15; 350/96.14; 350/96.17; 350/96.29; 350/96.30
[58] Field of Search ............... 350/96.10, 96.13, 96.14, 350/96.15, 96.16, 96.17, 96.29, 96.30

[56] References Cited

U.S. PATENT DOCUMENTS

| | | | |
|---|---|---|---|
| 3,208,342 | 9/1965 | Nethercot, Jr. | 350/96.29 |
| 4,012,113 | 3/1977 | Kogelnik et al. | 350/96.29 |
| 4,315,666 | 2/1982 | Hicks, Jr. | 350/96.15 |
| 4,360,247 | 11/1982 | Beasley | 350/96.29 |
| 4,386,822 | 6/1983 | Bergh | 350/96.15 |
| 4,461,536 | 7/1984 | Shaw et al. | 350/96.15 |
| 4,493,528 | 1/1985 | Shaw et al. | 350/96.15 |
| 4,536,058 | 8/1985 | Shaw et al. | 350/320 |
| 4,557,551 | 12/1985 | Dyott | 350/96.15 |
| 4,560,234 | 12/1985 | Shaw et al. | 350/96.15 |

FOREIGN PATENT DOCUMENTS 53-6052 1/1978 Japan ............................ 350/96.15

OTHER PUBLICATIONS

Kogelnik and Schmidt, IEEE Journal of Quantum Electronics, vol. QE-12, No. 7, Jul. 1976, pp. 396–401.

*Primary Examiner*—William L. Sikes
*Assistant Examiner*—Brian M. Healy
*Attorney, Agent, or Firm*—John H. Lynn

[57] ABSTRACT

This invention relates to an electrically switchable fiber optic directional coupler. Two oppositely oriented blocks of an interaction material are placed adjacent the fibers in an evanescent field coupler. Application of an electromagnetic field to the interaction material increases the refractive index of one fiber and decreases the refractive index of the other. The change in refractive indices of the blocks of the interaction material increases the propagation constant of one fiber and decreases that of the other fiber. The coupling of optical signals between the fibers may be varied between zero and 100% by controlling the applied field to change the propagation constants between values that provide complete cross coupling of light from one fiber into the other and straight through propagation provides an electrically controllable switching action.

21 Claims, 10 Drawing Figures

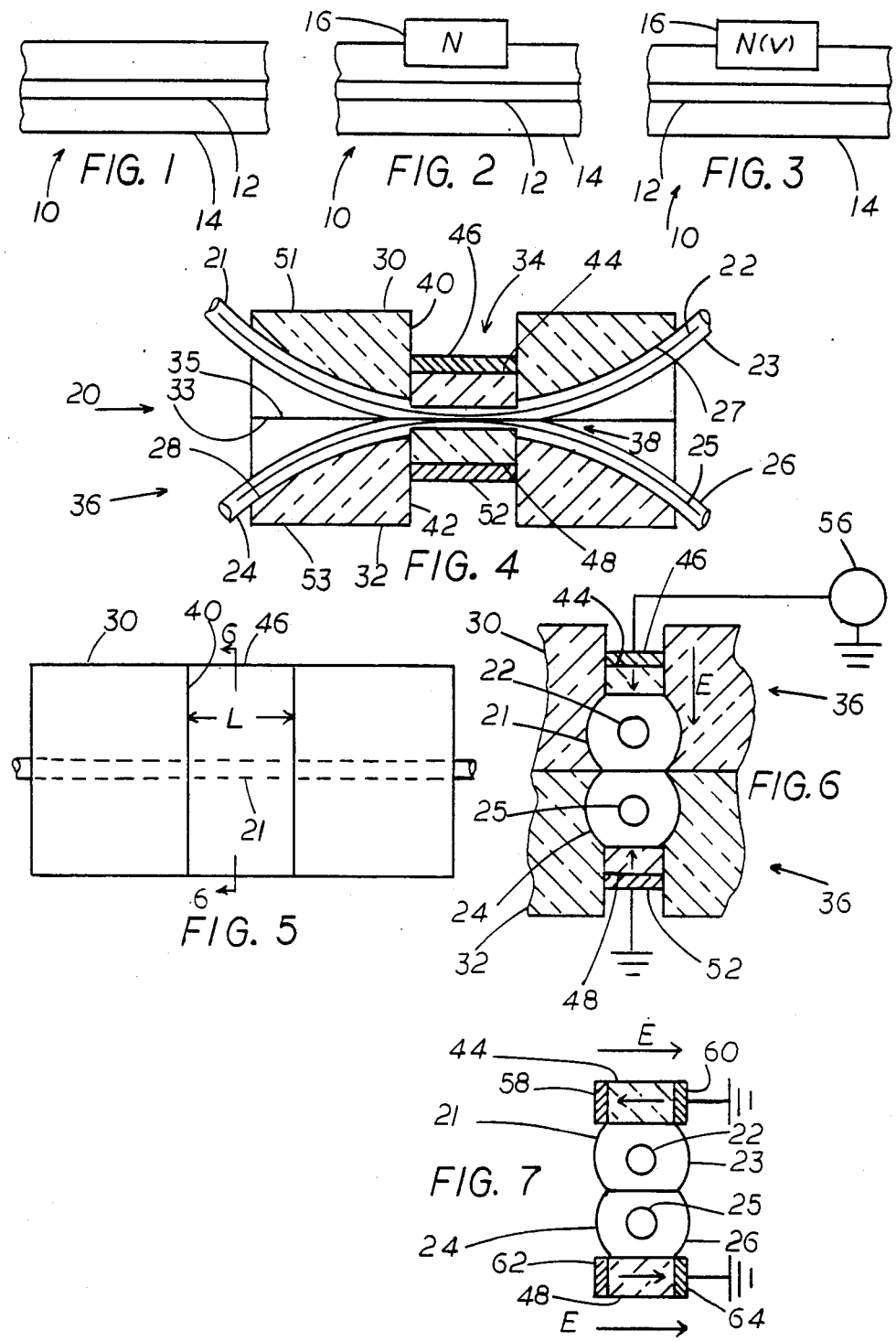

ELECTRICALLY SWITCHED FIBER OPTIC DIRECTIONAL COUPLER

BACKGROUND OF THE INVENTION

This invention relates generally to apparatus and methods for coupling optical signals from one optical fiber into another optical fiber. More particularly, this invention relates to fiber optic couplers for coupling optical signals from one fiber into another by means of evanescent field coupling. Still more particularly, this invention relates to apparatus and methods for electrically controlling the coupling of optical signals from one optical fiber into another.

A single-mode fiber optic coupler typically is a four port device comprising a pair of optical fibers having an interaction region in which part or all of the light input by one fiber couples into the other fiber and propagates away from the interaction region. The direction of propagation into the interaction region has no effect on the amount of coupling of light between the fibers. However, light couples only in the forward direction, or direction of propagation, so that reverse coupling between adjacent ends of the two fibers does not occur.

An optical fiber comprises a core and a cladding with the refractive index of the cladding being less than that of the core. The cladding may produce a single step decrease in refractive index, or the cladding may comprise a plurality of layers of material having different indices of refraction arranged so that there are several graduated decreases in the index of refraction as the distance from the edge of the fiber core increases. In both step and graded index fibers, light propagates essentially in the core because total internal reflections at the core-cladding interface prevent light from crossing the boundary layer from the core into the cladding. However, solving Maxwell's equations and applying the appropriate well-known boundary conditions to the components of the electric field normal and tangential to the core-cladding interface gives the result that a field that is exponentially decreasing with increasing radius propagates in the cladding. Those knowledgable in the fiber optic art usually call this exponentially decreasing field the evanescent field.

It is well-known that light may couple from a first fiber into a second fiber if the second fiber is within the evanescent field of the light propagating in the first fiber. The interaction region of a single mode coupler typically includes lengths of the fiber from which part of the cladding has been removed by grinding and polishing the fibers or by chemically etching a length of intertwined fibers. When light is input to a coupler formed by placing two polished fibers adjacent one another, the amount of coupling depends upon the propagation constants of the fibers, the lengths of the interaction region and the distance between the fiber cores.

To facilitate handling the fibers and controlling the amount of cladding removed, the fibers may be mounted in a curved groove in a suitable substrate, usually formed of fused quartz. The substrate is ground away adjacent a convex outward facing portion of the fiber. The substrate and fiber are ground and polished to be optically flat. Typically the grinding rate is known, and the depth to which cladding is removed is controlled by measuring the duration of the grinding process.

All-fiber optic couplers have been available having low insertion loss. However, prior all-fiber couplers are not switchable to control the coupling of a signal from one optical fiber into another. An unswitchable fiber optic directional coupler suitable for use in single mode applications is described in Bergh, Kotler and Shaw, *Electronics Letters*, Vol. 16, No. 7, March, 1980, pp. 260-261. Being heretofore unswitchable, all-fiber optic couplers have seen limited use in communications systems and in other applications where switching is essential.

Another type of optical coupler employs two integrated optics parallel strip optical waveguides. Some integrated optics couplers are switchable from DC to multigigahertz rates, but such couplers have high insertion loss in the connections between the parallel strip waveguides and optical fibers. Low insertion loss is desirable to avoid unacceptable signal attenuation. Insertion loss is particularly important in switching systems in which a signal may travel through two or more couplers in succession. An integrated optics parallel strip optical coupler is described by Kogelnik and Schmidt, IEEE Journal of Quantum Electronics, Vol. QE-12, No. 7, July 1976, 396-401.

SUMMARY OF THE INVENTION

The present invention overcomes the difficulties associated with the use of previously available optical couplers by providing an all-fiber coupler that is electronically switchable to control the percentage of an optical signal that couples from one fiber into another fiber. The switchable fiber optic coupler of the invention includes a pair of switchable half couplers. Each switchable half coupler may include a substrate, preferably formed of fused quartz having a curved groove therein. An optical fiber is placed in the curved groove, and the substrate is ground and polished to have an optically flat surface that includes the groove and a portion of the optical fiber from which a part of the cladding has been removed to form an interaction region. A slot or cavity is formed in the face of the substrate opposite the interaction region. The slot penetrates into the cladding of the fiber opposite the interaction region so that an interaction material, such as an electro-optically active crystal, having an index of refraction that varies in response to an externally applied field may be mounted in the substrate adjacent the fiber. The invention also includes means, such as an electrode, placed adjacent the electro-optically active crystal for applying a suitable electromagnetic field thereto for changing the index of refraction of the material.

The two half couplers are placed together in facing relationship so that the optically flat surfaces including portions of the fiber cores are adjacent. The fibers are coupled together by evanescent field coupling so that light initially propagating in one fiber may be coupled into the other fiber with a coupling efficiency that is continuously variable from essentially zero to 100%. The coupling between the fibers depends upon the propagation constants of the two fibers.

Application of electric fields to the half couplers on opposite sides of the interaction region varies the propagation constants of the two fibers. Proper arrangement of the electro-optically active crystals permits a simultaneous increase in the propagation constant of one fiber and a decrease in the propagation constant of the other fiber. Such control of the propagation constants permits control of the coupling efficiency. Electrically controlling the coupling efficiency by applying an appropriate field to the half coupler permits selective coupling, or switching, of an optical signal from one fiber into another.

BRIEF DESCRIPTION OF THE DRAWINGS

FIG. 1 schematically represents an optical fiber having a fixed propagation constant;

FIG. 2 schematically represents an optical fiber having its propagation constant perturbed by an interaction material;

FIG. 3 schematically represents an optical fiber having a propagation constant that is a function of voltage applied to the interaction material of FIG. 5;

FIG. 4 is a cross sectional view of a switchable directional coupler according to the invention;

FIG. 5 is a plan view of the switchable directional coupler of FIG. 1;

FIG. 6 is a cross sectional view about line 6-6 of FIG. 5;

FIG. 7 is a cross sectional view of an alternate electrode configuration of the switchable directional coupler of FIG. 4;

DESCRIPTION OF THE PREFERRED EMBODIMENT

Figure 8:
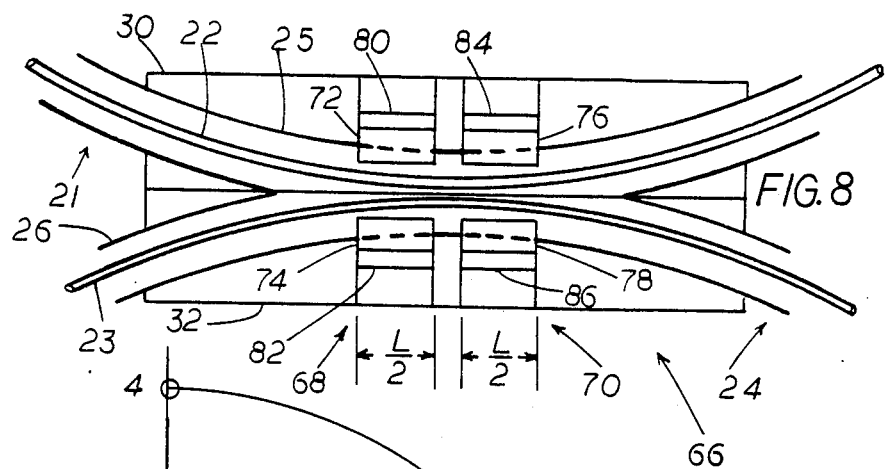
FIG. 8 schematically represents a second embodiment of a switchable directional coupler having a stepped reversal in change in propagation constant.

FIG. 1 illustrates an optical fiber 10 having a core 12 and a cladding 14. The optical fiber 10 has a propagation constant $\beta$ determined by the fiber structure and the wavelength of light propagating therein. If a material having a refractive index unequal to the refractive index of the cladding 14 is placed in the evanescent field of light propagating in the fiber 10, then the propagation constant of the fiber 10 is perturbed to a new value $\beta'$. FIG. 2 represents the fiber 10 having an interaction material 16 having an index of refraction, n, projecting into the cladding 14 to perturb the propagation constant. The propagation constant of the fiber 10 may be decreased or increased from its unperturbed value. FIG. 3 represents the index of refraction of the interaction material 16 as being a function of voltage, n(v), which causes the propagation constant $\beta'$ to be a function of voltage $\beta'(v)$, where the voltage is applied to the interaction material. If the voltage is controlled, the propagation constant of the fiber 10 may be varied in a known, controlled manner.

FIGS. 4-6 illustrate a switchable fiber optic coupler 20 according to the invention. The fiber optic coupler 20 includes a pair of optical fibers 21 and 24. The optical fiber 21 has a core 22 with a surrounding cladding 23, and the optical fiber 24 has a core 25 with a surrounding cladding 26. The optical fibers 21 and 24 are mounted in a pair of curved grooves 27 and 28, respectively, formed in a pair of substrates 30 and 32, respectively. For simplicity, the substrates 30 and 32 are shown to have generally rectangular surfaces. FIGS. 5 and 6 show the fibers 21 and 24 in exaggerated proportion for clarity of illustration.

The two fibers 21 and 24 are preferably formed to propagate a single mode of electromagnetic energy. Such single mode optical fibers are well-known in the art. The pair of curved grooves 27 and 28 are preferably formed in optically flat, confronting surfaces of the pair of substrates 30 and 32, respectively. The substrate 30 with the fiber 21 mounted in the groove 27 comprises a coupler half 34, and the substrate 32 with the fiber 24 mounted in the groove 28 comprises a coupler half 36.

The curved grooves 27 and 28 each preferably have radii of curvature which are very large compared to the diameters of the fibers 21 and 24. The widths of the grooves 27, 28 are slightly larger than the diameters of the fibers 21, 24 to permit the fibers 21 and 24, when mounted therein, to conform to paths defined by the bottom walls of the grooves 27 and 28, respectively. The depths of the grooves 27 and 28 vary from a minimum at the centers of the substrates 30 and 32, respectively, to a maximum at the edges thereof. The variation in groove depth permits the optical fibers 21 and 24, when mounted in the grooves 27 and 28, respectively, to gradually converge toward the center and diverge toward the edges of the substrates 30, 32, thereby eliminating any sharp bends or abrupt changes in direction of fibers 21, 24 that may cause power loss through mode perturbation. The grooves 27 and 28 may be rectangular in cross-section, however, it will be understood that other suitable cross-sectional configurations, such as U-shaped or V-shaped, which will accommodate the fibers 21, 24 may be used.

At the centers of the substrates 30, 32 in the embodiment shown, the depths of the grooves 27, 28 which mount the fibers 21, 24, respectively, are less than the diameters of the fibers 21, 24 after fabrication of the coupler halves 34, 36, respectively. At the edges of the substrates 30, 32, the depths of the grooves 27, 28 are preferably at least as great as the diameter of the fibers 21, 24 respectively. Fiber optic material is removed from each of the fibers 21, 24, e.g., by grinding and polishing, to form generally oval-shaped planar surfaces in the claddings 22 and 25 that are coplanar with corresponding surfaces 33, 35, of the substrates 30, 32. The surfaces 33, 35 where the fiber optic material has been removed form an interaction region 38. Thus, the amount of fiber optic material removed increases gradually from zero toward the edges of the substrates 30, 32 to a maximum toward the centers thereof. This tapered removal of the fiber optic material enables the fibers 21, 24 to converge and diverge gradually, which is advantageous for avoiding backward reflection and excessive loss of light energy.

In the embodiment shown, the coupler halves 34, and 36 are substantially identical and are assembled by placing the confronting surfaces of the substrates 30 and 32 together, so that the facing surfaces of the fibers 21 and 24 are juxtaposed in facing relationship.

Light is transferred between the fibers 21, 24 by evanescent field coupling at the interaction region 38. It has been found that to ensure proper evanescent field coupling, the amount of material removed from the fibers 21, 24 must be carefully controlled so that the spacing between the cores 22 and 25 of the fibers 21 and 24, respectively, is within a predetermined critical zone. The evanescent fields of light propagating within the fibers 21, 24 extend a short distance into the cladding 23, 26 respectively, and decrease rapidly in magnitude with distance outside the cores 22, 25, respectively. Thus, sufficient material should be removed to permit overlap between the evanescent fields of the fibers 21, 24. If too little material is removed, the cores 22 and 25 will not be sufficiently close to permit the evanescent fields to cause the desired interaction of the guided modes; and thus, insufficient coupling will result.

Conversely, if too much material is removed, the propagation characteristics of the fibers will be altered, resulting in loss of light energy due to mode perturbation. However, when the spacing between the cores 22 and 25 is within the critical zone, each fiber 21, 24 receives a sufficient portion of the evanescent field energy from the other to achieve good coupling without significant energy loss. The critical zone includes that area in which the evanescent fields of the fibers 21 and 24 overlap with sufficient strength to provide evanescent field coupling, i.e., each core 22, 25 is within the evanescent field of the other. However, as previously indicated, mode perturbation occurs when the cores 22, 25 are brought too close together. For example, it is believed that, for weakly guided modes, such as the $HE_{11}$ mode in single mode fibers, mode perturbation begins to occur when sufficient material is removed from the fibers 21, 24 to expose the fiber cores 22, 25. Thus, the critical zone is defined as the core spacing in which the evanescent fields overlap with sufficient strength to cause coupling without substantial mode perturbation induced power loss.

The extent of the critical zone 38 for a particular coupler 20 is dependent upon a number of interrelated factors such as the parameters of the fiber itself and the geometry of the coupler 20. Further, if the fibers 21 and 24 are single mode fibers having step-index profiles, the critical zone 38 may be quite narrow. In the switchable single mode fiber coupler 20, the required center-to-center spacing between the fibers 21, 24 at the center of the interaction zone 38 is typically less than a few (e.g., 2-3) core diameters.

Preferably, the fibers 21 and 24 (1) are identical to each other; (2) have the same radius of curvature at the interaction region 38; and (3) have equal amounts of fiber optic material removed therefrom to form the interaction region 38. Thus, the optical fibers 21, 24 are symmetrical through the interaction region 38 in the plane of their facing surfaces, which are coextensive if superimposed. Therefore, the two fibers 21 and 24, if unperturbed, will have the same propagation characteristics at the interaction region 38, thereby avoiding reduction in coupling associated with dissimilar propagation characteristics.

Still referring to FIGS. 4-6, the switchable coupler half 34 includes a slot 40 in the substrate 27 extending into the fiber 21 opposite the interaction region 38. The coupler half 36 includes a similar slot 42. The slots 40 and 42 penetrate into the claddings 22 and 25, respectively, to depths approximately equal to the thickness of cladding removed in the grinding and polishing steps to produce the interaction region 38.

A crystal 44 preferably formed of an electro-optically active material is placed within the slot 40 The crystal 44 is formed of a material having an index of refraction that is function of an externally applied electric field, which is a function of a voltage, v, applied to the crystal 38. Therefore the index of refraction of the electro-optically active material is a function, n(v), of the voltage applied thereto. The slot 40 extends into the cladding 23 a distance sufficient for the crystal 44 to perturb the propagation constant of the fiber 21.

An electrode 46 is placed over the crystal 44 for applying an electric field thereto. The electrode 46 may be formed by sputtering a suitable electrically conductive material on the crystal 44. The electrode 46 may also be cut from a sheet of suitable electrical conductor, such as metal, and may then be mounted to the crystal 40 with an adhesive.

A crystal 48 similar to the crystal 44 is mounted in the slot 42 in the substrate 28. The crystal 48 extends into the cladding 26 adjacent the interaction region 38; and an electrode 52, similar to the electrode 46, is mounted adjacent the crystal 48. The refractive indices of the crystals 44 and 48 in the absence of an applied field are preferably slightly less than the refractive indices of the claddings 22 and 25, which are preferably essentially identical. The crystals 44 and 48 are preferably isotropic, but may be birefringent. Suitable materials for the crystals 44 and 48 include potassium pentaborate, $KB_5O_8 \cdot 4H_2O$, and potassium dithianate, $K_2S_2O_6$. The slots 40 and 42 into which the crystals 46 and 48, respectively, are mounted may be conveniently formed by bonding the optically flat surfaces of the substrates 27 and 28 together and then grinding and polishing inward from the oppositely facing surfaces 51 and 53, which face in opposite directions from the confronting surfaces that form the interaction region 38.

The two half couplers 34 and 36 may be held together by a suitable adhesive or clamp (not shown), or they may be potted in a suitable potting material to retain them in the desired position relative to one another. The switchable coupler 20 may be formed with or without the substrates 27 and 28, which may be used only to hold the fibers 21 and 24, respectively, in proper position during the grinding and polishing operations. The fibers 21 and 24 may be removed from the substrates 27 and 28, respectively, after completion of the grinding and polishing operations; and the fibers 21 and 24, the crystals 44 and 48 and the electrodes 46 and 52 may be potted to form the switchable coupler 20.

A voltage source 56 supplies a control voltage to the electrode 46 while the electode 52 is grounded. The electric field applied to the crystals 44 and 48 is approximately equal to the control voltage divided by the distance between the electrodes 46 and 52. The crystals 44 and 48 are arranged so that one of them, for example, the crystal 48 is rotated 180 degrees about a line parallel to the fibers 21, 24 in the plane of the interaction region 38 relative to the other crystal 44. The result of this rotation is that the crystal axes of each of the crystals 44 and 48 aligned with the applied field point in opposite directions. The core 22 of the fiber 21 should be closer to the crystal 44 than to the crystal 48; and similarly, the core 25 of the fiber 24 should be closer to the crystal 48 than to the crystal 44. When the fibers 21 and 24 and the crystals 44 and 48 are arranged as described, application of a potential difference to the electrodes 46 and 52 causes the change in the refractive index of the crystal 44 to primarily affect the propagation constant of the fiber 21 while changes in the refractive index of the crystal 58 affect the propagation constant of the fiber 24.

The effect of the applied electric field on the crystals 44 and 48 when they are arranged as described is to increase the index of refraction of one, for example, the crystal 44 and to decrease the index of refraction of the other crystal 48. The asymmetric variation in the refractive indices of the crystals 42 and 48 imposes an asymmetrical change in the propagation constants of the fibers 21 and 24. For the structural arrangement described, the propagation constant of the fiber 21 increases while that of the fiber 24 decreases. The asymmetrical change in propagation constants varies the amount of light that couples between the fiber 21 and 24. Reversing the polarity of the control voltage reverses the change in propagation constants.

Proper control of the magnitude and polarity of the voltage permits selective switching of any fraction between zero and 100% of the light propagating in one of the fiber 21 and 24 into the other. The coupling efficiency may be varied between zero and 100% by application of control voltages of approximately 10 to 30volts, depending upon the length, L, of the interaction region. The electrodes 46 and 52 could be travelling wave electrodes similar to microwave stripline waveguides, which permit variations in control voltage at microwave frequencies to give very high switching rates.

The physical theory for the switching characteristics of the switchable coupler is similar to that of the switched coupler using two parallel strip waveguides as described by Kogelnik and Schmidt, *IEEE Journal of Quantum Electronics*, Vol. QE-12, No. 7, July 1976 and, therefore, is not presented in detail here.

The coherent light in the fiber 21 may be represented by a complex amplitude R(z) and that in the fiber 24 by a complex amplitude S(z). It is assumed that the energy exchange between the fibers 21, 24 is a codirectional coupled wave process that may be described by the coupled wave equations $$R' - j\delta R = -jkS \quad (1)$$

$$S' + j\delta S = -jkR \quad (2)$$

where the prime indicates differentiation with respect to z, which is chosen to be the direction of propagation, $\delta = \Delta\beta/2$, and k is the coupling coefficient. For arbitrary input amplitudes $R_0$ and $S_0$ the solution of the coupled wave equations (1) and (2) may be conveniently written in matrix form as $$\begin{pmatrix} R \\ S \end{pmatrix} = \begin{pmatrix} A_1 \\ -jB^*_1 \end{pmatrix} \begin{pmatrix} -jB_1 & R_0 \\ A^*_1 & S_0 \end{pmatrix} \quad (3)$$

where the asterisk indicates a complex conjugate, and the subscript 1 refers to the single pair of electrodes 46 and 52 of uniform $\Delta\beta = \beta_1 - \beta_2$. The problem involves solving the coupled wave equations for the matrix elements in the interaction region 38 where z=L. For z=L the matrix $$M_1^+ = \begin{pmatrix} A_1 & -jB_1 \\ -jB_1^* & A_1^* \end{pmatrix} \quad (4)$$

may be called the transfer matrix of the coupler 20. The transfer matrix $M_1^-$ of the coupler 20 when the change in propagation constant is $-\Delta\beta$ is of the form $$M_1^- = \begin{pmatrix} A_1^* & -jB_1 \\ -jB_1^* & A_1 \end{pmatrix} \quad (5)$$

The switchable coupler 20 cross couples light between the fibers 21 and 24 when A=0. Straight through propagation occurs when B=0.

Figure 9:
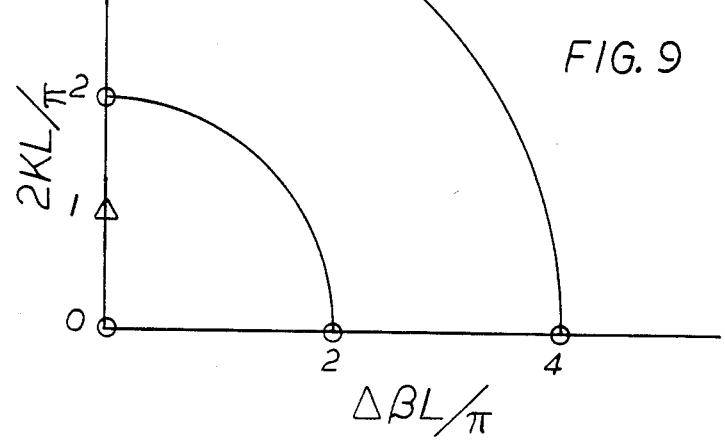
FIG. 9 is a switching diagram of the switchable directional coupler of FIG. 1.

The conditions for complete cross coupling and straight through propagation for the switched coupler 20 of FIGS. 4–7 are shown in the switching diagram of FIG. 9, where the values $2kL/\pi$ and $\Delta\beta L/\pi = 2L\delta/\pi$ are the coordinates. The isolated points on the vertical axis denoted by triangles represent states in which complete cross coupling occurs. The concentric arcs denoted by circles represent states in which straight through propagation occurs with no coupling between the fibers 21 and 24. The value of $2kL/\pi$ for the electrode configuration of the switchable coupler 20 is essentially independent of the applied voltage, but $\Delta\beta$ is a function of voltage and may be controlled electrically.

FIG. 7 illustrates an alternate electrode configuration for the coupler 20. The crystals 44 and 48 are placed adjacent the fibers 21 and 24, respectively, as described above. However, a pair of electrodes 58, 60 may be attached to opposite ends of the crystal 44. Application of an electric field E to the crystal 44 with the electrode 60 being grounded produces a change in the index of refraction of the crystal 44 through the electro-optic effect. A pair of electrodes 62, 64 may be attached to opposite ends of the crystal 48 so that application of an electric field thereto with the electrode 64 being grounded produces a change in the index of refraction of the crystal 48. If the electrodes 60 and 64 are grounded while a positive voltage is applied to the electrodes 58 and 62, then the changes in the refractive indices will be of opposite sign if the crystal axes indicated by the arrows on the crystals 44 and 48 are aligned oppositely with respect to the applied electric field E. If the crystal axes are aligned in the same direction, then oppositely directed electric fields must be applied to the crystals 44 and 48. In each case the result is an asymmetric change in the propagation constants of the fibers 21 and 24, which permits electronic control of the amounts of light cross coupled and propagated straight through. The electrodes 58, 60, 62 and 64 permit the use of lower control voltages to switch the coupler 20 between the straight through and completely cross coupled states and apply essentially no electric field directly to the fibers 21 and 24.

FIG. 8 illustrates a switched directional coupler 66 having an interaction length L divided into a pair of sections 68 and 70 each having length L/2. The section 68 includes a pair of oppositely oriented crystals 72 and 74, and the section 70 includes a pair of crystals 76 and 78 that may be oriented in correspondence with the crystals 72 and 74. The section 68 includes an electrode 80 adjacent the crystal 72 and an electrode 82 adjacent the crystal 74. Similarly, the section 70 includes an electrode 84 adjacent the crystal 76 and an electrode 86 adjacent the crystal 78. In the above-described configuration, the sections 68 and 70 have control voltages of opposite polarities applied to the electrode pairs 80, 82 and 84, 86.

A signal incident from the left in the fiber 21 as seen in FIG. 8 first sees a change in propagation constant of $\Delta\beta$ in the section 68 followed by a change in propagation constant of $-\Delta\beta$ in the section 70. The alternation of sign of the change in propagation constant may also be achieved by having the crystal pairs 72, 74 and 76, 78 oriented oppositely and by applying voltages of the same polarity to the electrodes 80 and 82 while the electrodes 84 and 86 are grounded. The transfer matrix of the coupler 66 is the product of the transfer matrices of the two sections 68 and 70 and is given by $$M_2 = M_1^- M_1^+ = \begin{pmatrix} A_2 & -jB_2 \\ -jB_2^* & A_2^* \end{pmatrix} \quad (6)$$

The simplest case mathematically is where the two changes in propagation constant are of the same magnitude. The matrix elements for the coupler 58 are given by $$A_2 = A_1 A_1^* - B_1 = 1 - 2B_1 \quad (7)$$

$$B_2 = 2A_1^* B_1 \quad (8)$$

Figure 10:
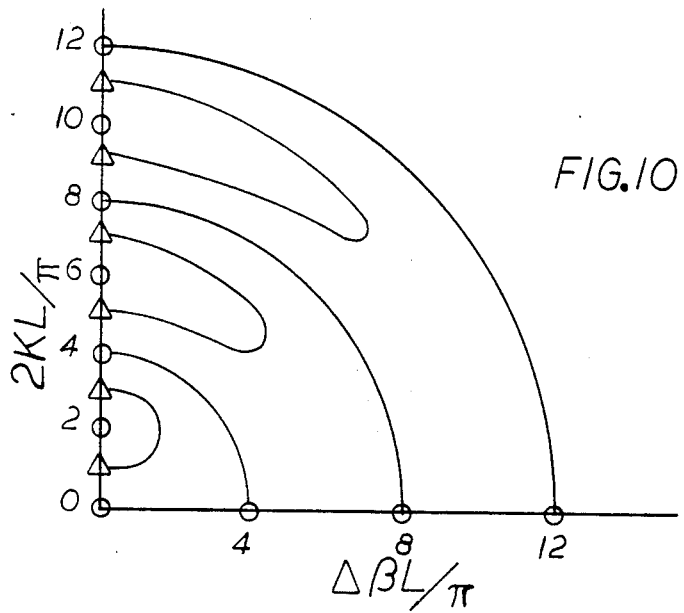
FIG. 10 is a switching diagram of the switchable directional coupler of FIG. 7.

Solution of the coupled wave equations for the segmented electrode configuration of the coupler 66 of FIG. 8 shows that there are several voltages for both straight through propagation and complete cross coupling. The switching diagram for the coupler 58 is given in FIG. 10. The lines and points denoted with triangles represent states of complete cross coupling, and the lines and points denoted with circles represent straight through propagation states. The single pair of electrodes 46 and 52 require high accuracy in the fabrication of the coupler 20 to have the correct coupling length, L, in order to have a possibility of complete cross coupling. Voltage adjustments cannot compensate for errors in fabrication of the coupler 20. However, fabrication of the coupler 66 does not require such stringent control in the interaction length because adjustment of voltage will provide several easily attainable points for both straight through propagation and complete cross coupling. The alternating change in propagation constant provided by the coupler 66 permits a variation of $2kL/\pi$ between various ranges, for example 1 to 3, for achieving complete cross over. FIG. 10 also gives the required change in propagation constant and, therefore, the voltage adjustment necessary for varying the coupler 66 between two points of complete cross coupling. Increasing the number of electrode sections to three or more produces results similar to those for the coupler 66 with the two electrode sections 68 and 70. Any segmented electrode configuration provides a characteristic family of curves representing states of straight through propagation and complete cross coupling. A segmented electrode configuration always provides at least one non-zero voltage that provides 100% cross coupling and one that provides straight through propagation. Adjacent electrodes in any segmented electrode configuration should be separated by a suitable insulator 85. To achieve 100% cross coupling, the first electrode segment encountered by an incident wave should preferably provide at least 50% coupling between the fibers 21 and 24.

Although the invention has been described with reference to specific preferred embodiments, it is to be understood that these specific embodiments are exemplary. Modifications may be made without departing from the scope and spirit of the invention as defined by the appended claims.

What is claimed is:

1. A switchable fiber optic directional coupler for selectively coupling optical signals between a first optical fiber having a first core, a first cladding and a first propagation constant and a second optical fiber having a second core, a second cladding and a second propagation constant comprising;
    means for forming an interaction region in which the evanescent field of light propagating in each of said optical fibers interacts with the other of said optical fibers;
    control means for interacting with the evanescent fields of light propagating in said optical fibers to control the propagation constants of the fibers and thereby control the coupling of light between said optical fibers, said control means including;
    a first block of an interaction material placed adjacent said interaction region;
    a second block of an interaction material placed adjacent said interaction region, the first and second blocks cooperating to increase one of the first and second propagation constants while decreasing the other; and
    means for applying an electric field to said first and second blocks to control the relative magnitude of first and second propagation constants.

2. The switchable fiber optic directional coupler of claim 1 wherein said means for forming an interaction region comprises a length of said first fiber and a length of said second fiber in which said first cladding and said second cladding are formed to have thicknesses such that the evanescent field of light propagating in each of said optical fibers extends into the core of the other of said optical fibers.

3. The switchable fiber optic directional coupler of claim 1 wherein said interaction material is electro-optically active so that the refractive index thereof is a function of the applied electric field.

4. The switchable fiber optic directional coupler of claim 1 wherein said interaction material is electro-optically active so that the refractive index thereof is a function of the applied electric field.

5. The switchable fiber optic directional coupler of claim 4 further including:
    a first electrode adjacent said first block;
    a second electrode adjacent said second block; and
    means for applying a potential difference across said first and second electrodes.

6. The switchable fiber optic directional coupler of claim 1 wherein said means for forming said interaction region comprises:
    a length of said first fiber where its cladding has a first generally planar surface formed therein;
    a length of said second fiber where its cladding has a second generally planar surface formed therein; and
    means for retaining said first and second generally planar surfaces in juxtaposition so that light propagating in each of said first and second fibers produces an evanescent field extending into the other of said first and second optical fibers.

7. The switchable fiber optic directional coupler of claim 6 wherein said first cladding includes a third generally planar surface substantially parallel to said first generally planar surface for mounting said first block of interaction material adjacent said first optical fiber so that said first block is within the evanescent field of light propagating in said first optical fiber and wherein said second cladding includes a fourth generally planar surface substantially parallel to said second generally planar surface for mounting said second block of interaction material adjacent said second optical fiber so that said second block is within the evanescent field of light propagating in said second optical fiber.

8. The switchable fiber optic directional coupler of claim 7 wherein said first and second blocks of material includes an electro-optically active material having a refractive index that is a function of an externally applied electric field.

9. The switchable fiber optic directional coupler of claim 8 including:
   a first electrode adjacent said first block;
   a second electrode adjacent said second block; and
   means for supplying a voltage to said first and second blocks.

10. The switchable fiber optic directional coupler of claim 9 wherein said first and second blocks are oriented such that an applied electric field increases the index of refraction of one said blocks while decreasing the index of the other of said blocks.

11. The switchable fiber optic directional coupler of claim 1 wherein said control means includes means for electronically switching between states of essentially straight through propagation and states of essentially 100% cross coupling of light between said first and second optical fibers.

12. The switchable fiber optic directional coupler of claim 11 including a switch which increases one of said first and second propagation constants relative to the other.

13. The switchable fiber optic directional coupler of claim 12 including a plurality of switch portions that produce successive differences in said first and second propagation constants of alternating sign.

14. The switchable fiber optic directional coupler of claim 13 wherein each of said switch portions includes:
   a pair of electro-optically active crystals adjacent said interaction region, said crystals having a pair of crystal axes being oriented oppositely so that an applied electric field increases the refractive index of one of said crystals while decreasing the refractive index of the other crystal.

15. A method for switching optical signals between a pair of optical fibers, each having a core, a cladding and a propagation constant, comprising the steps of:
   forming an interaction region in which the core of each of the optical fibers interacts with the evanescent field of light propagating in the other optical fiber;
   controlling the propagation constants of the optical fibers to selectively couple light therebetween;
   placing a first block of an interaction material having a refractive index that is a function of an applied electromagnetic field adjacent the first optical fiber;
   placing a second block of an interaction material having a refractive index that is a function of an applied electromagnetic field adjacent the second optical fiber; and
   applying an electromagnetic field to the blocks of interaction material to control the propagation constants of the optical fibers to control the amount of light that couples from one of the optical fibers into the other optical fiber.

16. The method of claim 15 wherein the controlling step includes the steps of:
   forming a first planar surface on the first optical fiber;
   forming a second planar surface on the first optical fiber parallel to the first planar surface;
   forming a third planar surface on the second optical fiber;
   forming a fourth planar surface on the second optical fiber parallel to the third planar surface;
   juxtaposing the first and third planar surfaces so that the evanescent field of light propagating in one of the optical fibers interacts with the core of the other optical fiber;
   mounting the first block adjacent the second planar surface;
   mounting the second block adjacent the fourth planar surface; and
   applying an electric field to the first and second blocks.

17. The method of claim 15 further including the step of alternately increasing and decreasing the propagation constant of the first optical fiber while alternately decreasing and increasing the propagation constant of the second optical fiber in successive segments in the interaction region.

18. The method of claim 17 further including the step of electrically controlling the difference between the propagation constants in each of the segments to selectively switch the optical fibers between states of straight through propagation and complete cross coupling of light between the optical fibers.

19. The method of claim 15 further comprising the step of dividing the interaction region into a plurality of segments.

20. The switchable fiber optic directional coupler of claim 1 wherein the interaction region comprises a plurality of segments.

21. A switchable fiber optic directional coupler for selectively coupling optical signals between a first optical fiber having a first core, a first cladding and a first propagation constant and a second optical fiber having a second core, a second cladding and a second propagation constant, comprising:
   means for forming an interaction region in which the evanescent field of light propagating in each of said optical fibers interacts with the core of the other of said optical fibers;
   control means for interacting with the evanescent fields of light propagating in said optical fibers to control the propagation constants of the fibers and thereby control the coupling of light between said optical fibers, said control means including:
   a block of an interaction material placed adjacent said interaction region, said interaction material having a refractive index; and
   means for applying an electric field to said block to adjust its refractive index to control the evanescent field interaction between light guided guided by each of the optical fibers with the core of the other optical fiber by adjusting the relative magnitude of first and second propagation constants.

* * * * *